United States Patent

[11] 3,611,305

[72] Inventors Lawrence E. Greenspan
Thorntons Ferry;
Earl J. Whitaker, Nashua, both of N.H.
[21] Appl. No. 798,033
[22] Filed Feb. 10, 1969
[45] Patented Oct. 5, 1971
[73] Assignee Scanders Associates, Inc.
Nashua, N.H.

[54] DATA PROCESSOR INTERRUPT SYSTEM
9 Claims, 5 Drawing Figs.

[52] U.S. Cl. .......... 340/172.5
[51] Int. Cl. .......... G06f 11/06
[50] Field of Search .......... 340/172.5; 235/157

[56] References Cited

UNITED STATES PATENTS

| | | | |
|---|---|---|---|
| 3,289,168 | 11/1966 | Walton et al. | 340/172.5 |
| 3,309,672 | 3/1967 | Brun et al. | 340/172.5 |
| 3,331,055 | 7/1967 | Betz et al. | 340/172.5 |
| 3,434,111 | 3/1969 | Schmidt et al. | 340/172.5 |
| 3,473,154 | 10/1969 | Couleur et al. | 340/172.5 |

*Primary Examiner*—Paul J. Henon
*Assistant Examiner*—Mark Edward Nusbaum
*Attorney*—Louis Etlinger

ABSTRACT: Interrupt indicator means are arranged in a multilevel pyramid configuration. Each level contains interrupt word storage means with each of the additional levels having fewer word storage means than the previous level. An interrupt condition will set a discrete storage means of the word storage means in each level of the pyramid. These discretes are retrieved, their addresses determined in each word storage means and the discrete addresses are combined to give the complete address of the interrupt condition. In addition, the simultaneous occurrence of more than one interrupt condition is sensed, and the address of each such interrupt condition is determined.

INVENTORS
LAWRENCE E. GREENSPAN
EARL J. WHITAKER
BY
ATTORNEY

INVENTORS
LAWRENCE E. GREENSPAN
EARL J. WHITAKER
BY
ATTORNEY

INVENTOR
LAWRENCE E. GREENSPAN
EARL J. WHITAKER
BY
ATTORNEY

INVENTOR
LAWRENCE E. GREENSPAN
EARL J. WHITAKER
BY
ATTORNEY

INVENTORS
LAWRENCE E. GREENSPAN
EARL J. WHITAKER
BY
ATTORNEY

DATA PROCESSOR INTERRUPT SYSTEM

BACKGROUND OF THE INVENTION

1. Field of the Invention

This invention relates generally to data processor interrupt systems and in particular to a means for detecting and identifying the interrupt condition.

2. Description of the Prior Art

The known techniques for detection and identification of interrupt conditions used to control operation in a data processor are adequate where small numbers of interrupt conditions occur. Such techniques, however, are generally unsatisfactory where large numbers of random interrupts must be handled. Extension of the conventional interrupt recognition techniques to applications such as process control or communications processing involves a great deal of hardware, which in turn, reduces the system reliability, increases the system response time to an interrupt condition and raises the cost.

One interrupt system of the prior art utilizes an arrangement of flip-flops, each flip-flop being coupled to an independent interrupt condition. A scanning apparatus is used to sequentially monitor the state of the flip-flops, until a set state is encountered. At this point, the scanning apparatus is stopped and held at the position indicating an interrupt and then transfers this position to a recovery routine in the data processor. This technique is not only time consuming, but has the disadvantage that a serious condition could occur between periodic checks which would not be sensed by the data processor until the scanner inspects that position, possibly much later in a system containing many possible interrupt conditions.

In another technique known in the prior art, each interrupt condition is assigned a memory address. Whenever an interrupt occurs, the address associated with that interrupt is loaded into the apparatus of the data processor provided to transfer to a recovery routine associated with that interrupt. A disadvantage of this technique is that considerable logic is required to generate an address for each interrupt condition.

SUMMARY AND OBJECTS OF THE INVENTION

Accordingly, an object of this invention is to provide an improved interrupt for a data processor.

Another object of this invention is to provide an interrupt system with increased speed of operation.

Still another object of this invention is to provide an interrupt system with increased speed of operation, simplified logic structure and increased reliability.

Yet another object of this invention is to provide an interrupt system utilizing a pyramid structure of interrupt-indicating means, each level of the pyramid being used to direct an interrupt locator to the address of the interrupted condition.

A further object of this invention is to provide an interrupt system utilizing a pyramid structure of interrupt-indicating means, such pyramid structure having a number of levels dependent upon the number of possible interrupt conditions.

Still a further object of this invention is to provide an interrupt system in a data processor capable of locating the address of a plurality of simultaneously occurring interrupt conditions.

Other objects will in part be obvious, and will in part appear hereinafter.

The invention accordingly comprises the features on construction, combination of elements and arrangement of parts which will be exemplified in the construction arranged herein and the scope of the invention will be indicated in the claims.

Briefly, the invention is embodied in apparatus which has a pyramid arrangement of interrupt indicator means. The pyramid has a number of levels, the number of levels dependent on the number of possible interrupt conditions. The first level of interrupt indicator means includes a plurality of interrupt word storage means. Each word storage means includes a plurality of discrete storage means. Each discrete storage means in the first level is connected to an independent interrupt condition.

There is at least one additional level of interrupt indicator means, each additional level having fewer interrupt word storage means than the previous level. The last level of the pyramid arrangement contains a single interrupt word storage means.

The occurrence of an interrupt condition will set a discrete storage means, for example, a flip-flop, in the first level of interrupt indicator means. The additional levels of indicator means are responsive to the word storage means in the first level wherein which the interrupt condition has been stored so that the interrupt condition is stored in the corresponding discrete storage means of the corresponding word storage means of the next additional levels.

With an indication (or discrete) of the interrupt condition now stored in each level of interrupt indicator means, a discrete locator device is provided to inspect the word storage means containing the discretes. The word storage means of the last level is inspired first. The address of the discrete in this last level word storage means is stored and in addition, directs the discrete locator device to that word storage means in the next lower level containing a corresponding discrete. The addresses of each of the discretes in each level of interrupt indicator means are similarly located and combined in storage until a complete address of the interrupt condition is produced.

Means are also provided for indicating the presence of more than one interrupt condition. The apparatus of the invention is recycled until all such interrupt condition addresses are located.

BRIEF DESCRIPTION OF THE DRAWINGS

. The foregoing and other objects, features and advantages of the invention will become apparent upon consideration of the following detailed description of a specific embodiment thereof, when taken in conjunction with the accompanying drawings, wherein.

DESCRIPTION OF THE PREFERRED EMBODIMENTS

Figure 1:
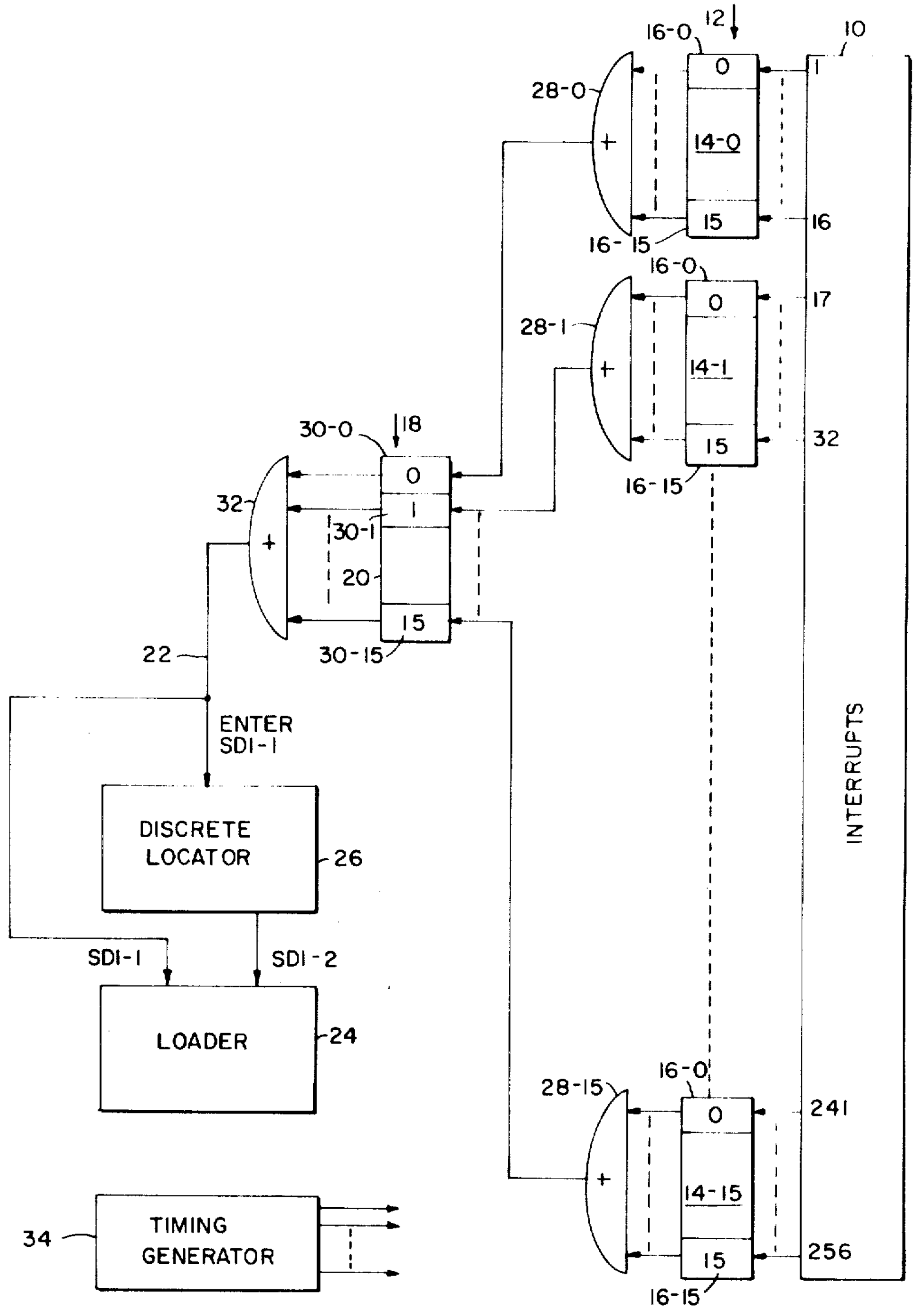
FIG. 1 is an illustration of a simplified block diagram of the interrupt system of the invention.

Referring to FIG. 1, there is illustrated the apparatus of the invention wherein a source of interrupts 10 includes, by way of example, 256 possible independent interrupt conditions. However, the apparatus of the invention is not limited to this number, as will be later illustrated. In a data processing system, some typical interrupt conditions encountered are AC or DC power failure, end of message, parity error, write out of bounds, illegal instruction, arithmetic overflow, external request, real time clock overflow, input/output operation complete, halt, etc. Where the data processing system is a type needed in communications processing and includes a number of input/output data channels, some of the above-mentioned interrupt conditions are repeated in number corresponding to the number of data channels in the system. In some systems configurations, the number of interrupt conditions are of such quantity that the apparatus of the invention must be used to reduce the time in identifying the exact source of an interrupt condition in order that effective communications time will not be seriously detrimented by the occurrence of an interrupt.

Each of the interrupt sources is connected to a pyramid arrangement of interrupt indicator or storage means. These storage means are illustrated as registers comprised of flip-flops in operational arrangement, however, other storage means such as core memory might be so used. The first level 12 in the pyramid arrangement of interrupt indicator means includes a plurality of interrupt word storage means 14–0 to 14–15. Each of the word storage means includes a plurality of discrete storage means 16. Each of the discrete storage means 16 is in actuality a flip-flop. Each of the additional levels of the interrupt indicator means has fewer interrupt word storage means than the previous level. In our example, one additional or second level, level 18, is shown, and includes one interrupt word storage means 20. The individual interrupt condition of interrupt source 10 is propagated through the first and second levels of the interrupt indicator means until a signal is generated on line 22. This signal which we shall call a Search for Discrete Indicator, SDI, causes the contents of the second level 18 interrupt word storage means 20 to be loaded by means of loader 24 into a register from which the discrete locator 26 determines the address of the interrupted discrete storage means of word storage means 20. In a similar manner, and as gated by the address of the interrupted discrete storage means of the second level 18, the address of the interrupted discrete storage means of first level 12 is determined. The combined addresses of the above two addresses are used to determine the exact source of the interrupt condition.

More specifically, the pyramid arrangement of the interrupt indicator means is as follows. The interrupt conditions of interrupt source 10 are grouped into 16 groups, each group containing 16 independent interrupt conditions, thereby making up the total 256 interrupt conditions. However, this illustrated aggregation of groups may be of any combination, such as 32 groups each containing eight independent interrupt conditions. Each group is connected to a word storage means or register 14 of word length, each individual interrupt condition being connected to the respective flip-flop in the register 14. For example, interrupt one is connected to discrete indicator means 16–0 of register 14–0 in the first level 12. The 16 outputs of each register 14–0, 14–1...14–15 are connected to corresponding OR gates 28–0, 28–1...28–15, respectively. The output of the OR gates 28 are connected to the second level 18 word storage means 20 in such a way that register 14–0 is connected to discrete storage means 30–0 of register 20 and so on, until register 14–15 is connected to discrete storage means 30–15 of register 20. The outputs of register 20 are connected to OR gate 32 whose output is the SDI signal on line 22.

The operation of the above-described apparatus will be considered for three possible conditions; firstly, when there is no interrupt, secondly, when there is a single interrupt, and thirdly, when there is more than one interrupt.

The first condition, namely, when there is no interrupt, is simply stated in that the SDI signal will not appear on line 22, since neither of the discrete storage means 30 are set to indicate an interrupt condition.

The second condition, namely, when there is one interrupt, will now be explained. For purposes of discussion, let us assume that the individual interrupt condition encountered from interrupt source 10 is interrupt number 16. Accordingly, discrete storage means 16–15 of word storage means 14–0 in first level 12 will be set to a logical one, thereby indicating the presence of a discrete. This discrete will be propagated through OR gate 28–0 and will set discrete 30–0 of register 20 in second level 18, thereby also indicating the presence of a discrete. This discrete will be transferred through OR gate 32 and will be interpreted as an SDI signal.

The prior art showed the simple but time-consuming means for repetitively scanning each of the possible interrupt conditions until an interrupt was found. The address of this interrupt condition can now be found with the apparatus of the invention by inspecting two interrupt word storage means; namely, register 20 and register 14–0.

Briefly, the address of the interrupt condition is determined by finding the address of the discrete in each register 20 and 14–0, and combining the addresses to determine the exact location of the interrupt. The addresses of the discrete in each register is found in the same way with the highest level register 20 being inspected first. The SDI signal causes the contents of register 20 to be loaded into a first register (a register in FIG. 4) by means of loader 24. A discrete locator 26 then searches this now-loaded first register as will later be explained until the discrete is found after which it loads the discrete address of register 20 into a second register. Upon determination of this first address another SDI signal (as explained later) will be generated such that the contents of register 14–0 will be loaded into the first register, and the set discrete in register 14–0 will be found by means of loader 24 and discrete locator 26, respectively.

It should be understood that the above sequence of events and those that are hereinafter discussed are in actuality controlled by means of a timing generator 34 whose output timing pulses are appropriately connected. Timing generator 34 may actually be controlled by the program of a data processing system and may be or any suitable design such as those illustrated at pages 337–341 of Arithmetic Operations in Digital Computers, by R. K. Richards, D. Van Nostrand Company, Inc., 1955.

The third condition, namely, that where there is more than one interrupt, will now be explained. For illustration purposes, let us assume that two interrupt conditions have occurred simultaneously. Let us also assume that one of the two interrupt conditions is the one mentioned above; i.e., interrupt condition 16. Let us also assume, by way of example, that the second interrupt condition is number 241.

Accordingly, interrupt condition 241 will set discrete 16–0 of register 14–15 in first level 12. This discrete will propagate through OR gate 28–15 to register 20 in second level 18, thereby setting discrete 30–15. Any set discrete in register 20 will produce an SDI signal after which the interrupt condition address will be located.

With the simultaneous occurrence of two interrupt conditions 16 and 241, we now have respective discretes set in registers 14–0 and 14–15, respectively. Register 20 in second level 18 has two discretes set. In operation, the address of the first interrupt condition will be located in the same way as hereinbefore stated. If more than one discrete is set in a single register, regardless of level, then a signal known as an Execution Status Code (ESC–3) will be generated, indicating the presence of more than one interrupt condition. In our example, register 20 in second level 18 has two discretes set; namely, discretes 30–0 and 30–15. Therefore, upon inspection of register 20 for a set discrete, an ESC–3 signal will be generated indicating the presence of more than one discrete. Because of this signal, once an address of one of the interrupts is found, the other interrupt's address will in sequence also be found in a similar manner. This operation can be seen more readily upon discussion of FIG. 2 which illustrates by functional flow the operation of the discrete locater 26.

Figure 4:
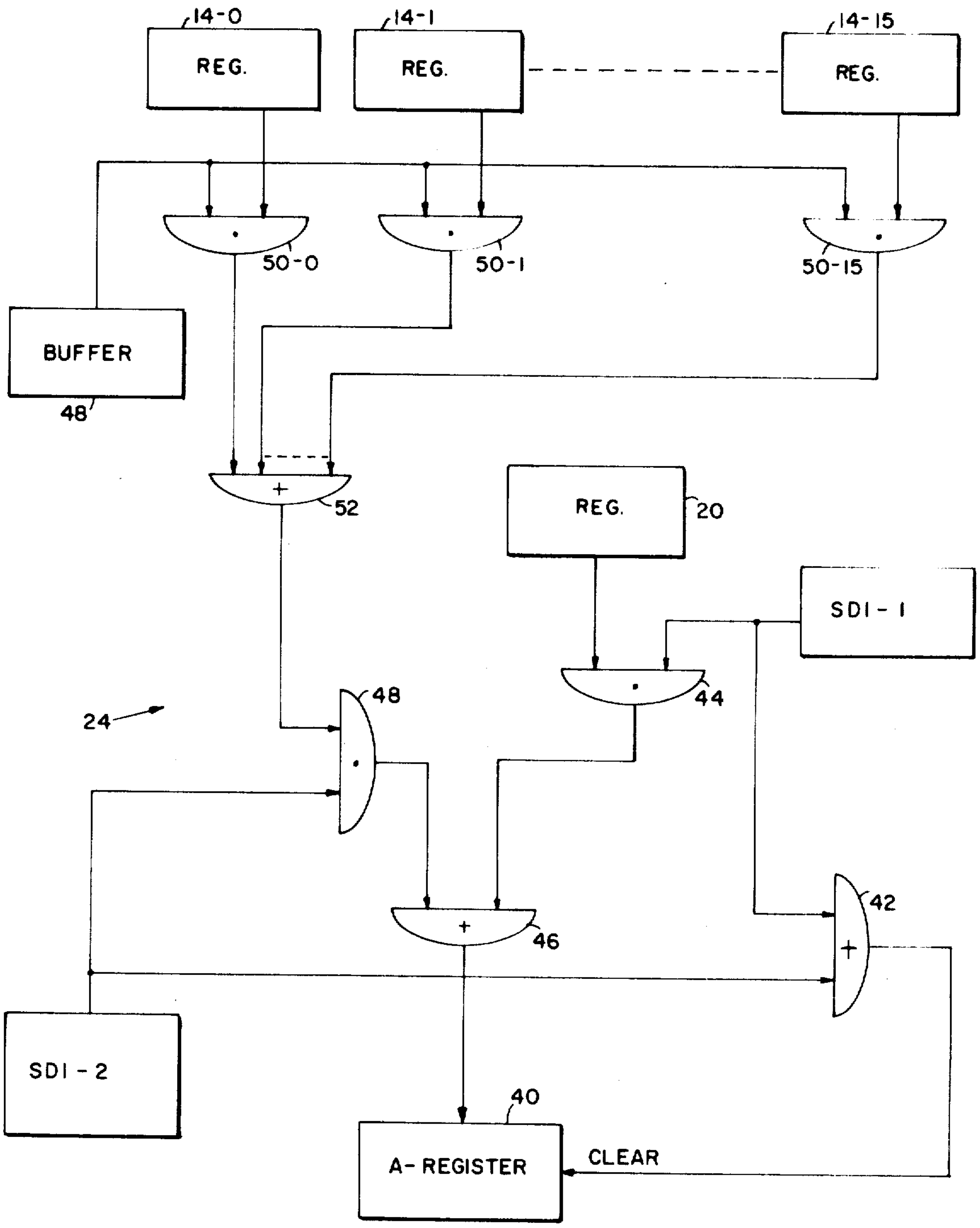
FIG. 4 is a schematic diagram of the word storage means word locator used in the interrupt system of the invention.

Before the discrete locater 26 can perform its function, the contents of register 20 must be loaded into a first register. This first register is referred to as the A-register 40 and is shown in FIG. 4. The operation of loader 24 will now be discussed. The contents of register 20, now containing at least one discrete, generates a first Search for Discrete Instruction signal SDI–1 via OR gate 32 in FIG. 1. Firstly, as shown in FIG. 4, SDI–1 will clear the A-register 40 via OR gate 42 after which it will condition AND gate 44 so that the total contents of register 20 are loaded into A-register 40 via OR gate 46. Register 20, however, still retains the contents now also loaded into A-register 40 until such time as all interrupt condition addresses are located or as otherwise cleared by some other priority condition.

The other input to OR gate 46 comes from one of the next lower level registers or in our example, the first level registers 14. Once the discrete locator 26 has determined the address of a first of several possible discretes 25 in register 20, the discrete locator 26 will present another SDI signal SDI–2 to the loader 24 after which SDI–2 will then restart the discrete locater 26 until the address of the discrete in first level 12, associated with the discrete just found in second level 18, is found. This second signal SDI–2 will clear the A-register 40 via OR gate 42, and then enable data from one of the registers in first level 12 into the A-register 40 via OR gate 46 by fully conditioning AND gate 48.

The register in first level 12, which will transfer its data, still retaining such data, will be that register in which the discrete was initially set directly from the interrupt source 10. In the example, register 14–0 contained the first discrete at discrete storage means 16–15. This discrete is propagated to set the first discrete 30–0 of register 20. As will be explained hereinafter in reference to FIG. 2 and FIG. 3, the address of discrete 30–0 will be utilized to gate the contents of the associated register in first level 12 into A-register 40. The address of discrete 30–0 will be stored in buffer 48 which may be any suitable register device having enough bit positions to store the address of the discrete. For example, each register stage may include a flip-flop, such as DTul 945 described in a product brochure entitled "DTul 945·DTul 948 Clocked Flip-Flop," Mar. 1965, of Fairchild Semiconductor, a division of Fairchild Camera and Instrument Corporation. The stored address will fully condition one set of AND gates 50–0 to 50–15. The set of AND gates fully conditioned in this example will be AND gates 50–0, thereby allowing the contents of register 14-0 to pass via OR gate 52 to AND gate 48 and then into the A-register 40 via OR gate 46. The address of the discrete in register 14–0 will be located in the same manner as the discrete in register 20 was so located, and in addition, a determination will be made as to whether any additional discretes are present.

Now referring to FIG. 2, the operation of discrete locator 26 will be explained by means of function flow after which the simplified apparatus of FIG. 3 will be discussed. Each SDI signal, i.e., SDI–1, SDI–2 or SDI–N, where there are N levels in the pyramid structure of the interrupt indicator means, may be thought of as the Enter SDI block 60. As shown in block 62, Enter SDI will reset a counter whose function is to keep track of the discrete storage means being inspected for a set discrete condition. The reset or binary zero output of the counter will be the address of the zero position discrete and so on until the binary 15 output of the counter will be the address of the last position discrete. Each discrete storage means will be checked for a set condition. First, the A-register 40, now loaded, will have its zero bit or left most bit, checked for a set condition as indicated in block 64. If there is such a set condition indicating the discrete, the count in from the counter will be inserted in the X-register a position according to the interrupt indicator level being examined, as indicated by block 66. Thus, the X-register will not have stored the address of the discrete storage means so set by the interrupt condition. A check will then be made as to whether other discretes are present as indicated by block 68. If there are no further discretes present, then an Execution Status Code signal designated as ESC–2 will be generated as indicated by block 70 and SDI will exit as per block 72. If there are other discretes present an ESC–3 signal per block 74 will be generated, which signal can be used to reinitiate the apparatus of the invention to find the address of other discretes present.

On the other hand, if the test in block 64 gives a no answer; i.e., no discrete present, and if the counter output is not equal to 15 as per block 76, then the contents of the A-register are shifted one bit or discrete as shown in block 78. Also, the counter is incremented to keep track of the discrete storage means being tested, which is shown in block 80. The bit-zero or discrete-zero position of A-register 40 is again checked for a discrete set condition, actually the position one discrete storage means of the word storage means is now being so checked because of the shift mentioned just above. If the answer in block 64 is no, the functions of blocks 76, 78, 80 and 64 are repeated until the answer of block 64 is yes, or until the answer of block 76 is yes; that is, the counter has reached the count of fifteen indicating that all of the discrete storage means of the word storage means have been checked for set discretes. When the counter has reached the count of 15, this will generate a signal ESC–1 as per block 82, indicating that no set discretes were present.

Depending on the number of levels in the pyramid, this function of the discrete locator 26 is repeated until the X-register contains the entire address of the independent interrupt condition. The entire process is repeated if ESC–3 is present until all interrupt condition addresses are located or as otherwise halted by other commands not shown.

Figure 2:
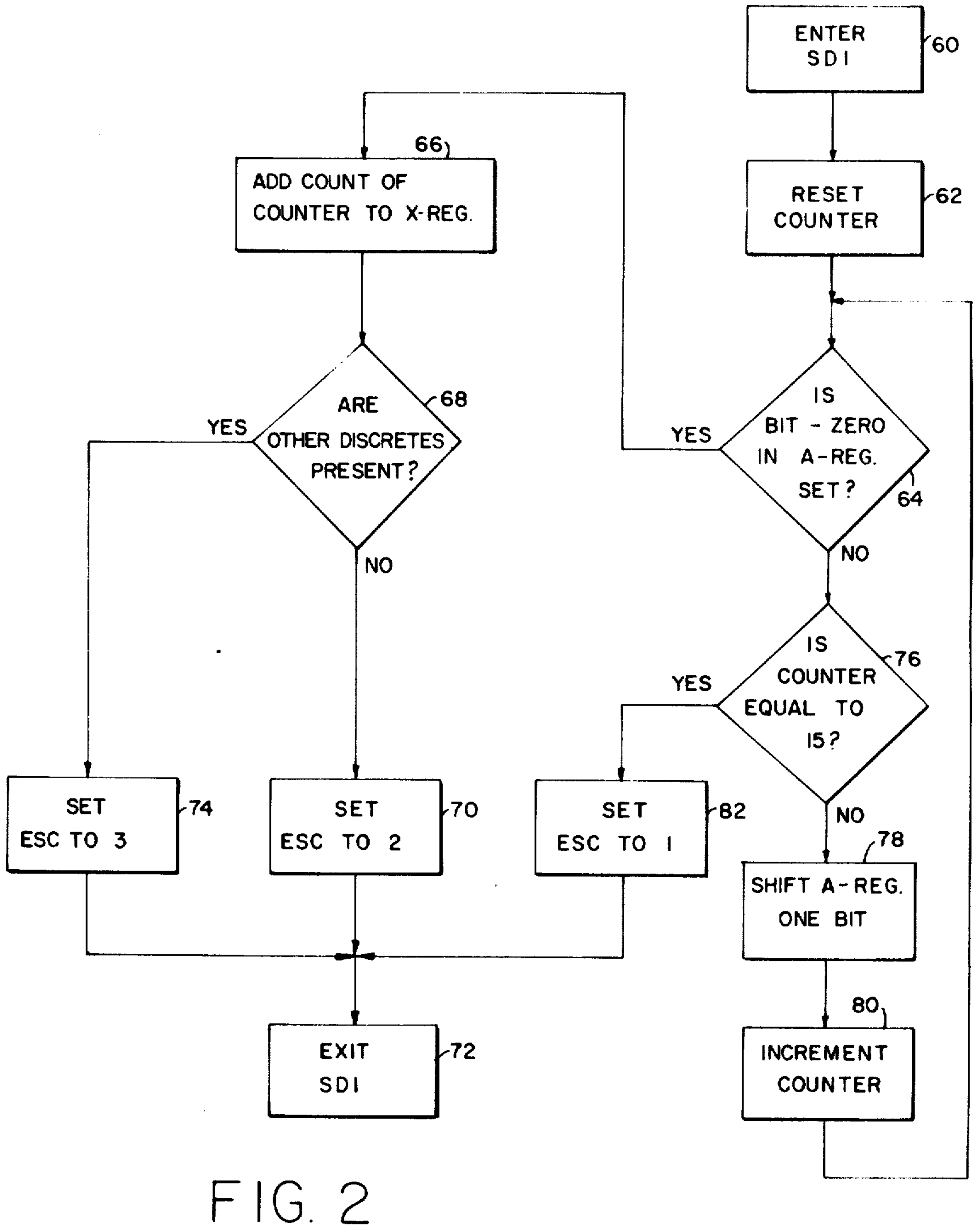
FIG. 2 is a functional logic flow diagram of the discrete locator used in the interrupt system of the invention.
Figure 3:
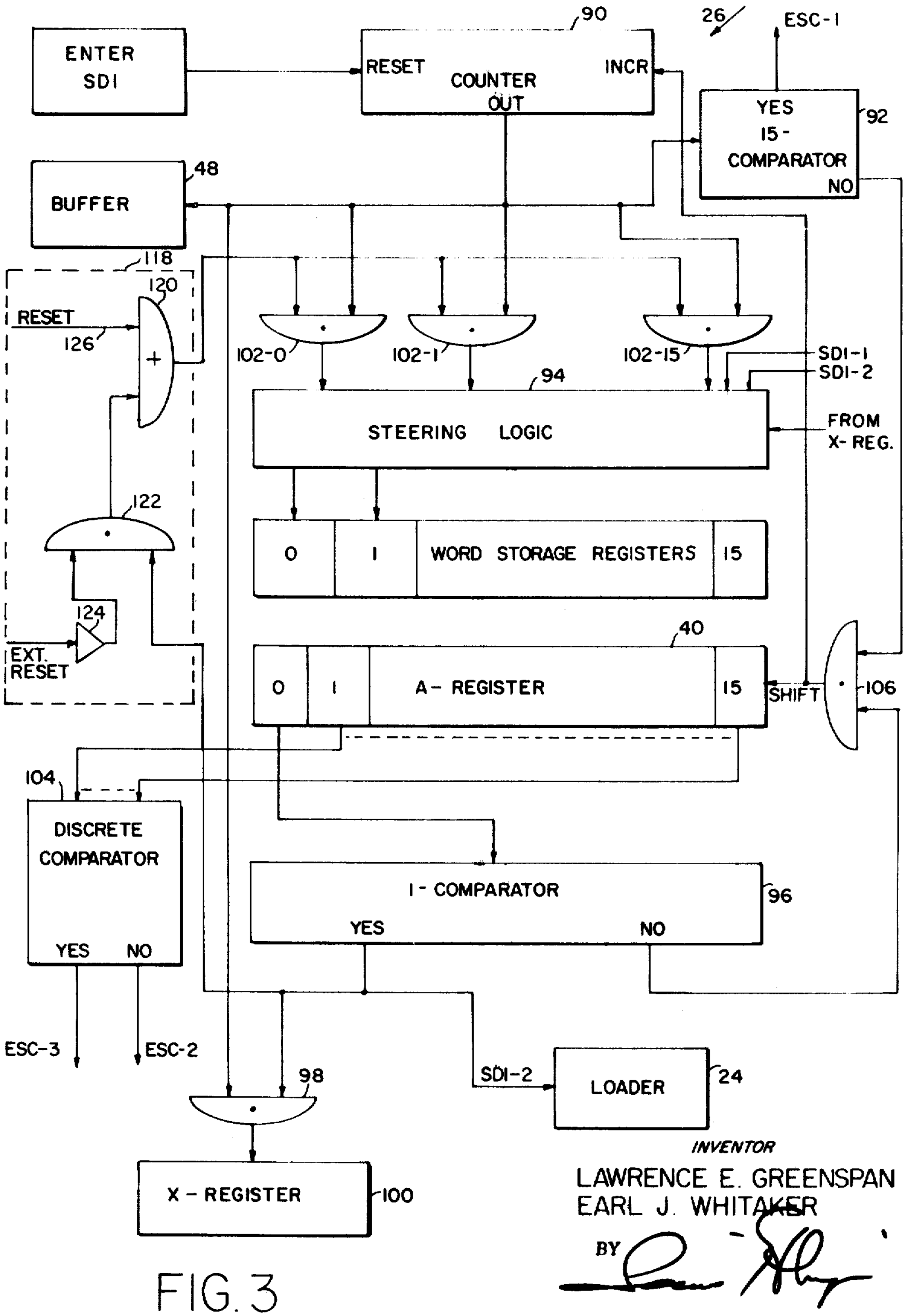
FIG. 3 is a schematic diagram of the discrete locator used in the interrupt system of the invention.

More specifically, the logical flowpath of FIG. 2 is illustrated in FIG. 3 by way of a simplified schematic diagram. By way of example, and using the same interrupt conditions as previously used, namely, interrupt conditions 16 and 241, the operation is as follows.

The presence of any SDI signal will reset counter 90, whose output is continuously being checked by 15-comparator 92 for the count of 15, in which case an ESC–1 signal is generated. Since in the example, discrete 30-0 of register 20 in second level 18 is set, then position zero of the A-register 40 is a logical one. This logical one signal will be sent to the input of 1-comparator 96. The 1-comparator 96 checks for a logical one input and upon sensing a logical one as the output of the zero position of A-register 40, the yes output of 1-comparator 96 will emit a logical one fully conditioning AND gate 98 to enable the count from counter 90 to be appropriately inserted in X-register 100. Thus, the address of the set discrete in second level 18 is now stored in X-register 100 as a binary number. The binary number will be 0000. Four zeros are necessary since, in the example, each word storage means has 16 discrete storage means. The logical one from the 1-comparator 96 yes output will also reset discrete storage means 30–0 of register 20 via external reset logic 118 and by means of AND gate 102–0, which has been fully conditioned by the binary zero count of counter 90. That is, the reset signal will appear on one of the 16 output leads of the gates 102–0 through 102–15 as determined by the counter value (address of second level discrete) which leads correspond to respective ones of the 16 discretes in a register. The output of AND gate 102–0 will be gated by steering logic 94 to reset the appropriate discrete in the word storage register just inspected for a discrete. The steering logic 94 must therefore select the correct one out of seventeen registers (second level register 20 and first level registers 14–0 through 14–15). To this end the SDI–1 and SDI–2 signals are employed by the logic 94 such that the presence of the SDI–1 signal, signifying the second level inspection, gates the reset signal from one of the 16 output leads of gates 102–0 through 102–15 to a corresponding one of the 16 discretes in second level register 20. Thus, steering logic 94 may suitably employ a 16 gate arrangement similar to the upper gate level in FIG. 3–5(*a*) at page 74 of the aforementioned Richards textbook (but no including the lower level decoding there shown) where the gates are coupled between the output leads of AND gates 102–0 through 102–15 and the discretes 30–0 through 30–15, respectively, with all gates being enabled by the presence of the SDI–1 signal. The remainder of the steering logic 94 necessary to steer a reset signal to the appropriate discrete of the first level registers will be referenced hereinafter.

The reason that the set discrete whose address was just found is reset is that if other discretes are present the apparatus of the invention will not be capable of finding the addresses of these other discretes. The reason for this will be obvious as hereinafter discussed. The external reset logic 118 is implemented where it is desirable to retain the set discrete just inspected in the appropriate word storage register, or that further checks may be made before the next level of interrupt indicator means is inspected. Logic 118 comprises AND gate 122 which is conditioned for direct reset by 1-comparator 96 via inverting amplifier 124 when the External Reset signal is low. The output of AND gate 122 then passes through OR gate 120 and resets the proper discrete as hereinbefore mentioned. When an External Reset signal is made, for example, by a computer program, the output of inverting amplifier 124 is low thereby inhibiting any resetting directing from 1-comparator 96. In the External Reset state, the reset may then be made at any time but before the next level is inspected, by means of the reset pulse from an external source on line 126 to one input of OR gate 120. The output of OR gate 120 in response to the Reset pulse on line 126 will rest the proper discrete similarly as hereinbefore mentioned.

The binary zero count will also be stored in buffer 48, whose purpose explained partly hereinbefore with reference to FIG. 4 will be further explained hereinafter. Having the address of the set discrete stored in the X-register 100, the contents of the A-register 40 in positions one to 15 will be checked for a set discrete by discrete comparator 104. Since in our second example, discrete 30–15 has also been set by the second interrupt condition 241, position 15 of A-register 40 will have a logical one at its output which when operated on by discrete comparator 104 will generate an ESC–3 signal at its yes output, indicating that other discretes are present. The operation on these other discretes will be discussed later.

The yes output, now a logical one, from 1-comparator 96 will be sent to loader 24 as the SDI–2 signal. Also sent to loader 24 is the contents of buffer 48 which is address or count of the discrete 30–0. As hereinbefore discussed, the contents of register 14–0, as steered or gated by the address in buffer 48, will be loaded into the A-register 40, the A-register 40 having been previously cleared by timing generator 34. The set discrete in the A-register 40 is in position 15 whose output is a logical one. SDI–2 The SDI–2 signal will reset counter 90. The yes output of 1-comparator 96 will not be a logical one until the counter 90 has been incremented to a count of 15. In the meantime, for each position of A-register 40 inspected the no output of 1-comparator 96 will be a logical one, which output will partially condition AND gate 106. Because 15-comparator 92 does not see a count of 15, its no output will be a logical one and will fully condition AND gate 106 causing the contents of A-register 40 to be shifted one place to the left so that what was in position one is now in position zero. At the same time that the A-register 40 is commanded to shift, the counter 90 is incremented.

The contents of A-register 40 are shifted and the counter 90 is incremented until a discrete is found, which in our example is position 15. Once the contents of position 15 are in position fifteen are in position zero of the A-register 40, 1-comparator 96 will present a logical one at its yes output. Accordingly, AND gate 98 will be fully conditioned to enable the address or count from counter 90 to be inserted into the X-register 100. This binary count will be 1111 and when juxtaposed to the already existing address in the X-register 100, it will now contain the complete address location of the interrupt condition 16. The binary number in X-register 100 will therefore be 00001111. The discrete comparator 104 will produce an ESC–2 signal at its no output since no other discretes are present.

Also the set discrete 16–15 of register 14–0 would be reset by means of AND gate 102–15 which would be conditioned by the binary 15 count from counter 90 and the output of OR gate 120 in the external reset logic 118; and by means of the steering logic 94 would then direct the logical one reset pulse at the output of AND gate 102–15 to position 15 of the just-inspected word storage register. For the purpose of first level register selection, the steering logic responds to the previously stored (in X-register 100) second level discrete or first level register four bit address to guide the reset signal to the correct register as shown by the X-register input thereto in FIG. 3. For the first level gating function, the steering logic 94 may suitably include an arrangement of 16 four-variable gating matrices, each of the type shown at page 76 of aforementioned Richards textbook where the matrices are coupled to different ones of the outputs of gates 102–0 through 102–5 and arranged to be enabled by the SDI–2 signal, signifying a first level inspection, to accept the first level register address from the X-register 100. The 16 outputs of each matrix would be coupled to the like ordered discretes of the 16 first level registers which order corresponds to the order of the corresponding AND gate 102–0 through 102–15. For example, the 16 outputs of the matrix coupled to different ones of the discretes 16–15 in the first level registers 14–0 through 14–15.

Had there been three levels of registers in the pyramid arrangement of the apparatus of the invention, the SDI–2 signal would have been interpreted as an SDI–3 signal and the address now stored in buffer 48 would have been used as before to direct the loader 24 to the appropriate register in level three.

If no discretes had been present, the 15-comparator 92 would have emitted an ESC–1 signal. This situation might be incurred for instance by an external request in a test mode of operation.

Having now determined the address of interrupt condition 16 from interrupt source 10, we have fully discussed the example where there is only one interrupt condition present. Accordingly, the address of the first interrupt would be utilized by a data processor, with which the apparatus of the invention is associated, to execute an appropriate subroutine based on the exact cause of the interrupt. For example, if the interrupt condition address indicates a parity error on data channel eleven of the data processor, the subroutine might send a signal interpreted as "inform data channel 11 to repeat the message."

In our second example, we additionally stated that a second interrupt condition 241 has also occurred. Having cleared the X-register 100, we must now load into it the complete address of the second interrupt condition 241. Because we previously developed an ESC–3 signal indicating that other discretes are present, and because discrete 30–15 of register 20 is still set, the apparatus of the invention will interpret this as a command to reinitiate the discrete address locator cycle discussed above.

Briefly, the SDI–2 signal causes loader 24 to load the contents of register 20 into the A-register 40. Note that only one discrete 30–15 is now set, discrete 30–0 having been previously reset. The discrete locator 26 then operates on the contents of the A-register 100. Accordingly, the address now in X-register 100 is 1111. After discrete 30-15 is reset, the binary 15 count in buffer 48 and the SDI–2 signal directs loader 24 to load the contents of register 14-15 in first level 12 into the A-register 40. The discrete locator 26 then finds the address of the set discrete 16–0 in register 14–15 which is then juxtaposed to the already existing address in X-register 100. The address added is the binary number 0000 which causes the complete address of the interrupt condition now stored in the X-register 100 to be 11110000. This address is then used in a subroutine as before. Note that since the discrete comparator 104 did not sense the presence of other discretes, the Execution Status Code is now ESC–2 indicating that no other discretes are present and causing the operating of the apparatus of the invention to be terminated. If other set discretes were present an ESC–3 signal would have been generated and all remaining set discrete addresses would have been located.

It has been seen that the complete address of each interrupt condition out of a possible 256 interrupt conditions has been located utilizing a double level pyramid arrangement of a word storage means, and that only two load operations and two discrete locate operations have been required. The apparatus of the invention has therefore reduced the time required to locate or identify the exact source of the interrupt condition and does so utilizing a simplified combination of logic elements.

Figure 5:
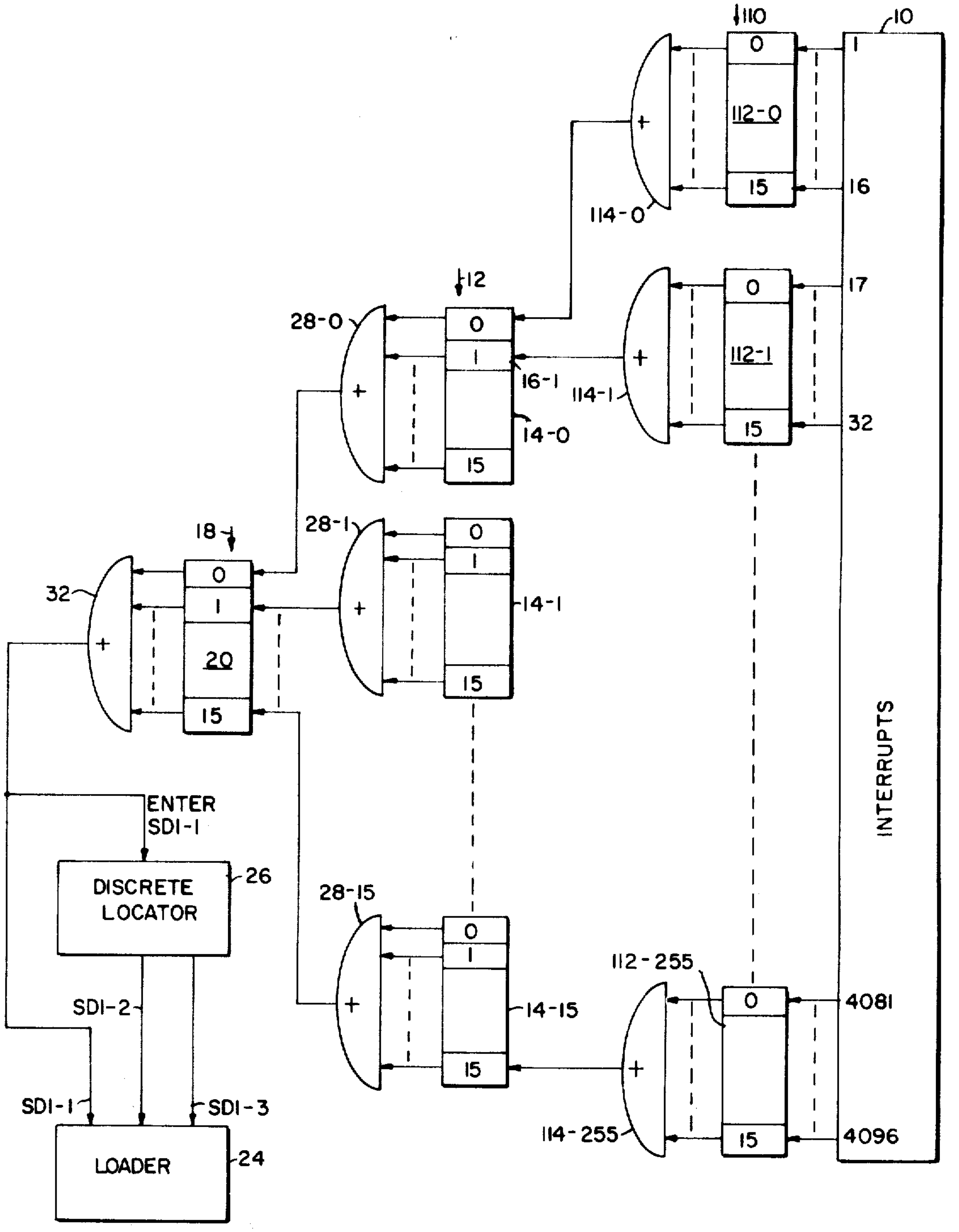
FIG. 5 is a simplified block diagram of the interrupt system of the invention illustrating three levels of interrupt indicator means.

Heretofore we have discussed and shown by example a pyramid arrangement comprising two levels of word storage means and we have suggested the possibility of more than two levels. Accordingly, illustrated in FIG. 5 is a pyramid arrangement of the interrupt indicator means of the invention illustrating three levels of word storage means. This combination gives the apparatus of the invention the capability of locating the address of 4,096 independent interrupt conditions from interrupt source 10. The complete address located and stored in X-register 100 will in the three level arrangement contain 12 bits whereas in the two level arrangement the complete address contains eight bits.

The added or third level is indicated as level 110. This level 110 contains a plurality of word storage means 112–0 to 112–225. In the example shown, the word storage means 112 each contain sixteen discrete storage means. Therefore, there must be 256-word storage means coupled to interrupt source 10 in order to accommodate 4,096 independent interrupt conditions. Each one of these word storage means 112 in level 110 is coupled to the corresponding word storage means in level one 12 by way or OR gates 114–0 to 114–255. Thus, by way of example, a set discrete in register 112–1 of level 110 will propagate through OR gate 114–1 and will set discrete 16–1 in register 14–0 of level on 12 which set discrete in turn propagates to set the corresponding discrete in register 20 of level two 18.

The loader 24 and discrete 26 operate in the same way for the three level arrangement of FIG. 5 as did the two level arrangement of FIG. 1. The addition of the SDI–3 signal is utilized to find the address of the discrete set in level 110. Thus in order to find the address of a single interrupt condition out of a possible 4,096 interrupt conditions, the apparatus of the invention utilizes just three load operations and three discrete locate operations resulting in a simplified apparatus of increased speed.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described the invention, what is claimed as new and secured by Letters Patent is:

1. Apparatus for locating the address of an interrupt condition in a data processor, said apparatus comprising:
   A. a word means, said word storage means including a plurality of discrete storage means, for storing said interrupt condition in one of said discrete storage means,
   B. a counter, said counter being reset in response to said interrupt condition;
   C. means for sequentially inspecting each of said discrete storage means of said word storage means wherein which said interrupt condition has been stored until said interrupt condition is located; and
   D. means for incrementing said counter in corresponding with said inspecting means until said interrupt condition is located by said inspecting means, whereby said counter so incremented indicates the address of said interrupt condition.

2. Apparatus as defined in claim 1 wherein said means for sequentially inspecting includes:
   A. means for determining whether said discrete storage means in the first position of said word storage means has an interrupt condition stored therein;
   B. means for shifting the contents of said word storage means in response to the absence of an interrupt condition in said first position so that the possible interrupt condition in said discrete storage means in the first position of said word storage means is now in the discrete storage means in the first position of said word storage means; and
   C. means for repeating said means for determining and said means for shifting until said interrupt condition is located.

3. Apparatus as defined in claim 2 further including means for determining whether said word storage means wherein which said interrupt condition has been stored contains interrupt conditions.

4. A method for locating the address of an interrupt condition in a data processor, said method comprising the steps of:
   A. loading said interrupt condition into a discrete storage means, said discrete storage means being one of a plurality of discrete storage means in a word storage means;
   B. resetting a counter in response to the loading of said interrupt condition;
   C. inspecting each of said discrete storage means of said word storage means wherein which said interrupt condition has been stored until said interrupt condition is located; and
   D. incrementing said counter in correspondence with said inspecting until said interrupt condition is located by said inspecting, whereby said counter, so incremented, indicates the address of said interrupt condition.

5. A method as defined in claim 4 wherein said inspecting step includes the additional steps of:
   A. determining whether said discrete storage means in the first position of said word storage means has an interrupt condition stored therein;
   B. shifting the contents of said word storage means in response to the absence of an interrupt condition in said first position so that the possible interrupt condition in said discrete storage means originally in the second position of said word storage means is now in the discrete storage means in the first position of said word storage means; and
   C. repeating said means for determining and said means for shifting until said interrupt condition is located.

6. Data processor interrupt apparatus comprising:
   a plurality of registers each having a plurality of bit storage devices, said registers being arranged in first and second levels, the first level having more register than the second;
   a source of interrupt signals, each signal signifying the occurrence of corresponding interrupt conditions;
   means responsive to said interrupt signals for storing the occurrence of the different interrupt conditions in corresponding ones of the first level bit storage devices;
   a gating network for coupling all the bit storage devices of each first level register to different second level bit storage devices and responsive to first level stored interrupt conditions so as to further store them in corresponding second level storage devices, whereby the address of each second level storage device corresponds to the address of the associated first level register;
   means responsive to a stored interrupt condition to provide a locate address signal;
   a counter which is reset in response to said locate address signal;
   means for sequentially inspecting each of said second level storage devices until a device storing an interrupt condition is located; and
   means for changing the value of said counter as the inspecting means inspects each device until the device storing said stored interrupt condition is located, whereby the count value, so changed, indicates the second level address of said stored interrupt condition.

7. Apparatus as set fourth in claim 6 and further including means responsive to a located second level address to cause said counter inspection means and count value changing means to locate the address of the bit storage device in the corresponding first level register wherein an interrupt condition is stored.

8. Apparatus as defined in claim 7 and further including means for determining whether said second level storage devices contain additional stored interrupt conditions.

9. Apparatus as defined in claim 7 and further including means for combining the addresses of said first interrupt condition in each level to produce the address of said interrupt condition.

PO-1050
(5/69)

UNITED STATES PATENT OFFICE
CERTIFICATE OF CORRECTION

Patent No. 3,611,305 Dated October 5, 1971

Inventor(s) Lawrence E. Greenspan and Earl J. Whitaker

It is certified that error appears in the above-identified patent and that said Letters Patent are hereby corrected as shown below:

| | |
|---|---|
| Column 2 line 18 | change "inspired" to --inspected--. |
| Column 2 line 45 | change "locator" to --loader--. |
| Column 4 line 71 | delete "25" after --discretes--. |
| Column 6 line 75 | change "directing" to --directly--. |
| Column 7 line 5 | change "rest" to --reset--. |
| Column 7 line 43 | delete "15 are in position". |
| Column 7 line 70 | change "102-5" to --102-15--. |
| Column 8 line 39 | After "A-Register" insert --until the address of discrete 30-15 is inserted into X-Register". |
| Column 9 Line 5 | change "112-225" to --112-255--. |
| Column 9 line 14 | change "on" to --one--. |
| Column 9 line 38 | After the first occurrance of "word" insert --storage--. |
| Column 9 line 47 | change "corresponding" to --correspondence--. |
| Column 9 line 60 and 61 | change "in the first position" to --originally in the second position--. |

Signed and sealed this 2nd day of May 1972.

(SEAL)
Attest:

EDWARD M.FLETCHER,JR.
Attesting Officer

ROBERT GOTTSCHALK
Commissioner of Patents